(No Model.)

H. J. THOMPSON.
SAW TABLE.

No. 346,241. Patented July 27, 1886.

WITNESSES:
C. Neveux
Jno. Mathew Ritter

INVENTOR:
H. J. Thompson
BY Munn & Co
ATTORNEYS.

UNITED STATES PATENT OFFICE.

HERBERT J. THOMPSON, OF OGEMA, WISCONSIN.

SAW-TABLE.

SPECIFICATION forming part of Letters Patent No. 346,241, dated July 27, 1886.

Application filed July 28, 1885. Renewed April 19, 1886. Serial No. 199,452. (No model.)

*To all whom it may concern:*

Be it known that I, HERBERT J. THOMPSON, of Ogema, in the county of Price and State of Wisconsin, have invented a new and Improved Knot-Saw Table, of which the following is a full, clear, and exact description.

The object of my invention is to provide a new and improved knot-saw table for cutting off the sap-wood and cutting out the knots of shingles, and thereby cutting the edges of the shingles straight and true.

The invention consists in the combination, with a carriage, of a slide on the same, an arm on the slide, and a block on the end of the arm, which block is on line with a ledge on the end of the slide.

Reference is to be had to the accompanying drawings, forming part of this specification, in which similar letters of reference indicate corresponding parts in all the figures.

Figure 1:
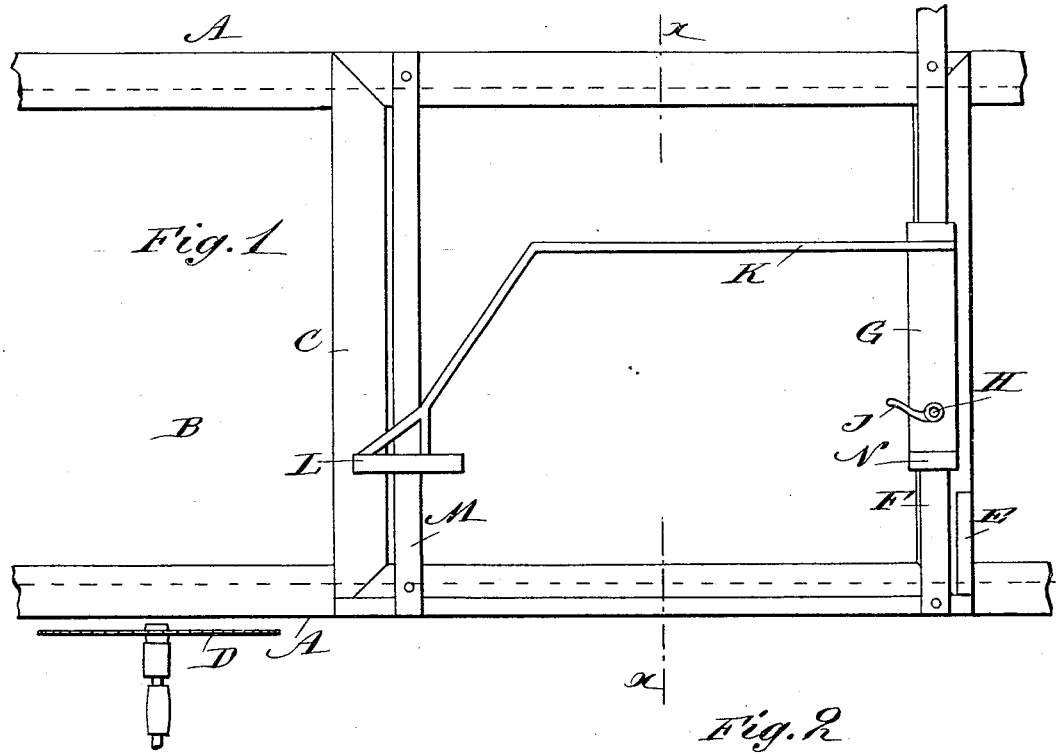
Figure 2:
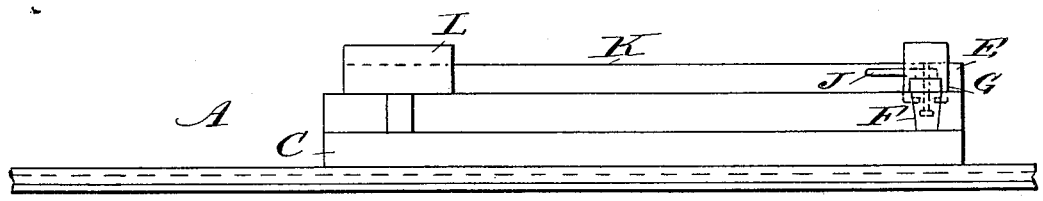
Figure 3:
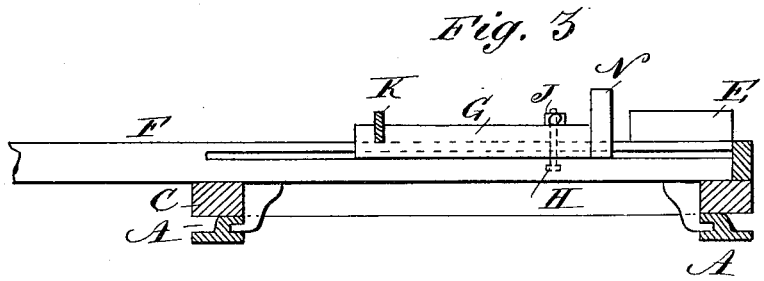

Figure 1 is a plan view of my improved knot-saw table. Fig. 2 is a side view of the same. Fig. 3 is a cross-sectional view of the same on the line $x\ x$, Fig. 1.

On the grooved or other guides A, on the table B, the carriage C is mounted to slide parallel with the circular saw D at the side of one of the guides A. The carriage C is provided at one end and at the side adjacent to the saw with a ledge, E, against which the end of the shingle to be cut can be abutted.

On a grooved cross-piece, F, of the carriage a slide, G, is mounted to slide transversely to the direction in which the carriage slides, and the said slide is provided with a bolt, H, and key J for locking it in place on the cross-piece F.

On the slide G a rod or arm, K, is held, which is bent angularly, and in the free end of the said arm a block, L, is held, which rests loosely upon a cross-piece, M, of the carriage C, the outer edge or face of the said block L being in line with a block ledge or stop, N, on the slide G, the right line uniting the outer surfaces of the block L, and the ledge N being parallel with the guide A and the plane of revolution of the saw D.

The operation is as follows: The shingle to be cut is placed on the carriage C and its inner edge rested against the block L and the ledge N, and the outer edge part, that is to be cut off, projecting beyond the side of the carriage, the slide G having been previously so adjusted that the desired width of the shingle projects beyond the side of the carriage. As the shingle rests against the block L and ledge N, which are in line, the shingle will be cut absolutely true, and will have the same width at both ends.

My improved attachment can be applied on old or new carriages C.

Instead of securing the arm permanently on the slide G, it may be pivoted and provided with a curved slot, through which a bolt passes, on which a nut is mounted.

Having thus described my invention, I claim as new and desire to secure by Letters Patent—

1. In a knot-saw table, the combination, with a carriage, of a sliding piece on the same, which can slide transversely to the direction in which the block to be sawed is moved, and an arm on said sliding piece, which arm projects over the carriage in the direction of the length of the same and is provided with a rest or stop on its free end, substantially as shown and described.

2. In a knot-saw table, the combination, with a carriage, of a slide on the same, a ledge on the end of the slide, an arm projecting from the slide over the carriage in the direction of the length of the same, and of a block on the end of said arm, the side of the block being in line with the end ledge of the slide, substantially as herein shown and described.

3. In a knot-saw table, the combination, with a carriage, of a slide on the same, an arm projecting from the slide over the table in the direction of the length of the same, a block on the end of said arm, and a device for locking the slide on the carriage, substantially as herein shown and described.

4. In a knot-saw table, the combination, with a carriage, C, having the ledge E, of the slide N, mounted to slide transversely on the carriage, and provided at one end with the ledge M, the arm K, secured on the slide and projecting over the carriage in the direction of the length of the same, and the block L on the end of said arm, the side of the block L being in line with the side of the ledge N, substantially as herein shown and described.

HERBERT J. THOMPSON.

Witnesses:
JOS. JOHANN,
GEO. S. DAVIS.